United States Patent [19]

Savage

[11] 4,173,294

[45] Nov. 6, 1979

[54] DISPENSER HAVING RECIPROCATING PADDLES FOR DISCHARGING PARTICLES THEREFROM

[75] Inventor: Robert C. Savage, Macedon, N.Y.

[73] Assignee: Xerox Corporation, Stamford, Conn.

[21] Appl. No.: 809,346

[22] Filed: Jun. 23, 1977

[51] Int. Cl.[2] .............................................. G01F 11/10

[52] U.S. Cl. ........................................ 222/1; 118/658; 198/742; 222/404; 222/409; 222/DIG. 1; 355/3 DD

[58] Field of Search ................... 222/1, 229, 233, 234, 222/273, 274, 276, 280, 333, 404, 409, 412, 413, 504, DIG. 1; 355/3 DD; 118/658; 214/17 D; 198/742, 540, 550

[56] References Cited

U.S. PATENT DOCUMENTS

| | | | |
|---|---|---|---|
| 840,845 | 1/1907 | Heath | 222/404 X |
| 2,504,787 | 4/1950 | Bailey | 222/412 X |
| 2,858,011 | 10/1958 | Wahl | 222/413 |
| 3,065,844 | 11/1962 | Mildh | 198/742 |
| 3,162,336 | 12/1964 | Erickson | 222/504 X |
| 3,305,141 | 2/1967 | Wheeler | 222/412 X |
| 3,882,823 | 5/1975 | Tanaka | 118/658 X |
| 3,888,393 | 6/1975 | Drori | 222/229 |

*Primary Examiner*—Robert J. Spar
*Assistant Examiner*—Fred A. Silverberg
*Attorney, Agent, or Firm*—J. J. Ralabate; C. A. Green; H. Fleischer

[57] ABSTRACT

An apparatus in which particles are advanced from a storage container through a tube having a plurality of apertures therein. The particles are moved along the tube by paddles secured to a shaft so as to be discharged through the apertures in the tube. The shaft is mounted reciprocably and rotatably within the tube. In this manner, the paddles engage the particles during its forward movement while being spaced therefrom during the return to its initial position.

6 Claims, 6 Drawing Figures

DISPENSER HAVING RECIPROCATING PADDLES FOR DISCHARGING PARTICLES THEREFROM

BACKGROUND OF THE INVENTION

This invention relates generally to an electrostatographic printing machine and more particularly concerns an improved toner dispensing apparatus for use therein.

The art of electrostatographic printing includes both electrographic printing and electrophotographic printing. In both of the foregoing processes, a latent image, which corresponds to an original document being reproduced, is recorded. Electrophotography achieves this by charging a conductive member to a substantially uniform potential. The charged photoconductive member is exposed to a light image of the original document. As a consequence of this exposure, the charge is selectively dissipated in the irradiated areas in accordance with the light intensity reaching the photoconductive member. This records an electrostatic latent image corresponding to the informational areas contained within the original document. Electrographic differs from electrophotographic printing only in that the latent image is created without the use of a photoconductive member. Hence, the process of electrophotographic printing requires the use of a suitable photoconductor whereas electrography does not.

In both electrophotography and electrography, the latent image is developed by contacting it with a developer mix. Generally, a suitable developer mix comprises dyed or colored thermoplastic particles, known in the art as toner particles, mixed with carrier granules, such as ferromagnetic granules. The toner particles and the carrier granules are triboelectrically attracted to one another with the toner particles adhering to the outer surface of the carrier granules. As the developer mix contacts the latent image, the greater attractive force of the latent image causes the toner particles to transfer thereto from the carrier granules. The toner particles adhere to the latent image in image configuration.

It is evident that during the development cycle, toner particles are depleted from the developer mix. Thus, additional toner particles must be furnished subsequently to the developer mix so as to maintain copy density at a substantially optimum level. It is apparent that in order to produce an efficient printing machine, it is necessary to conveniently and effectively replenish the toner particles used in the formation of copies.

It is a primary object of the present invention to improve toner particle dispensing by advancing the toner particles across the development system uniformly in a gentle manner.

PRIOR ART STATEMENT

Various types of devices have hereinbefore been developed to improve toner particle dispensing systems. The following prior art appears to be relevant:

| | | |
|---|---|---|
| Olden | 2,892,446 | 1959 |
| Stavrakis et al | 2,910,964 | 1959 |
| Frobach et al | 3,134,849 | 1964 |
| Hunt | 3,013,703 | 1969 |
| Eichorn | 3,389,863 | 1968 |

The pertinent portions of the foregoing prior art may be briefly summarized as follows:

Olden, Stavrakis et al and Frobach et al all disclose various techniques for dispensing toner particles from a hopper while the hopper is being vibrated.

Hunt teaches the use of a reciprocating gate on the bottom of a toner dispenser to discharge particles therefrom.

Eichron discloses a toner container adapted to dispense toner particles from a block of toner. A plurality of reciprocating blades are mounted in the bottom of the container. The block of toner is biased against the blades. The blades are bent in a honeycomb configuration to insure complete coverage of the toner block and are mounted in a pair of end blocks. As the blades move across the surface of the toner block they produce a scraping action which removes portions of the toner material therefrom.

It is believed that the scope of the present invention, as defined by the appended claims, is clearly patentably distinguishable over the foregoing prior art taken either singly or in combination with one another.

SUMMARY OF THE INVENTION

Briefly stated, in accordance with the present invention, there is provided an apparatus for dispensing particles.

Pursuant to the features of the present invention, the apparatus includes means for storing a supply of particles. Means, in communication with the storing means, receive the particles therefrom. The receiving means has a plurality of apertures therein extending in a longitudinal direction. Means are provided interiorly of the receiving means for moving the particles to the apertures in the receiving means. The moving means translates from a first position to a second position to advance the particles. In addition, the moving means rotates from an operative position engaging the particles to an inoperative position spaced from the particles when returning from the second position to the first position.

BRIEF DESCRIPTION OF THE DRAWINGS

Other objects and advantages of the present invention will become apparent upon reading the following detailed description and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
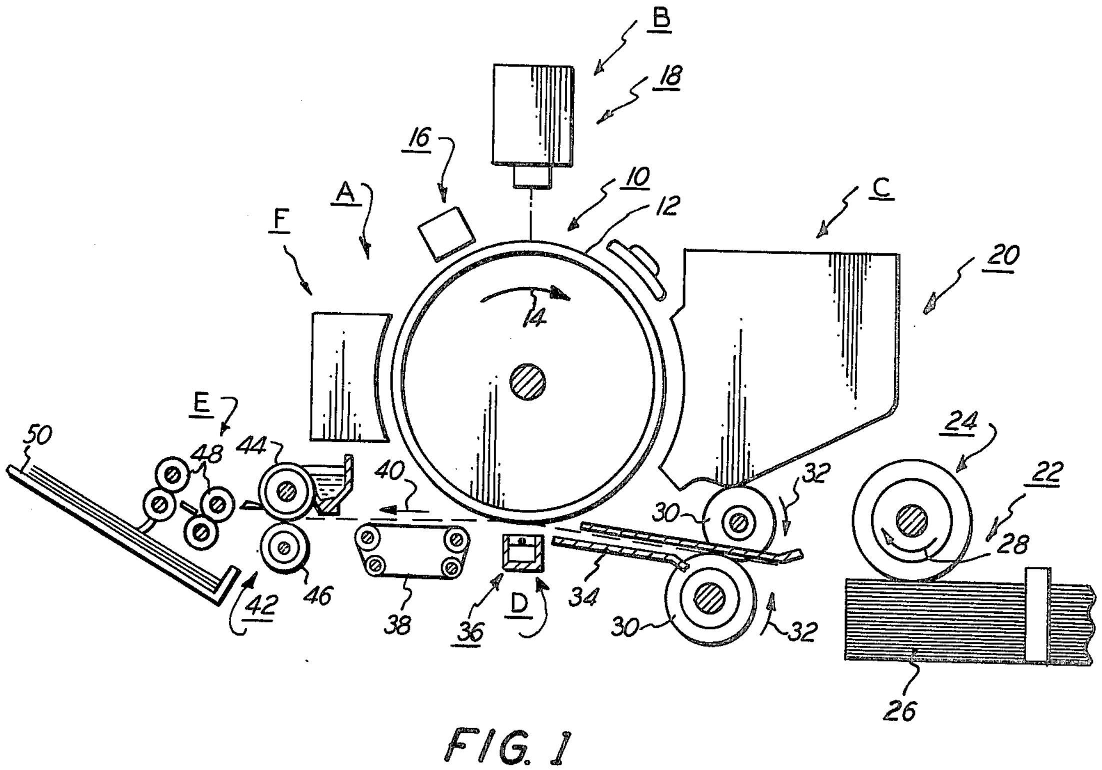
FIG. 1 is a schematic elevational view depicting an electrophotographic printing machine incorporating the features of the present invention therein.

For a general understanding of an electrophotographic printing machine in which the features of the present invention may be incorporated, reference is had to FIG. 1 which depicts schematically the various components thereof. Hereinafter, like reference numerals will be employed throughout to designate identical elements. Although the apparatus for dispensing toner particles to the development system employed in the electrophotographic printing machine of FIG. 1, is particularly well adapted for use therein, it should be become evident from the following discussion that it is equally well suited for use in a wide variety of devices and is not necessarily limited in its application to the particular embodiment shown herein.

Inasmuch as the pratice of electrophotographic printing is well known in the art, the various processing stations for producing a copy of an original document are represented schematically in FIG. 1. Each processing station will be briefly described hereinafter.

As in all electrophotographic system of the type illustrated, a drum 10 having a photoconductive surface 12 entrained about and secured to the exterior circumferential surface of a conductive substrate is rotated in the direction of arrow 14 through the various processing stations. One type of suitable photoconductive material is described in U.S. Pat. No. 2,970,906 issued to Bixby in 1961. A suitable conductive substrate is an aluminum.

Initially, drum 10 rotates photoconductive surface 12 through charging station A. Charging station A employs a corona generating device, indicated generally by the reference numeral 16, to sensitize photoconductive surface 12. Corona generating device 16 is positioned closely adjacent to photoconductive surface 12. When energized, corona generating device 16 charges photoconductive surface 12 to a relatively high substantially uniform potential. For example, corona generating device 16 may be of the type described in U.S. Pat. No. 2,836,725 issued to Vyverberg in 1958.

Thereafter, drum 10 rotates the charged portion of photoconductive surface 12 to exposure station B. Exposure station B includes a stationary, transparent platen, such as a glass plate or the like, for supporting an original document thereon. Lamps illuminate the original document. Scanning of the original document may be achieved by oscillating a mirror in a timed relationship with the movement of drum 10 or by scanning the lamsp and lens system in synchronism therewith across the platen. In either case, the light image of the original document is reflected onto the charged portion of photoconductive surface 12. Irradiating the charged photoconductive surface records an electrostatic latent image corresponding to the informational areas contained within the original document.

Drum 10 next rotates the electrostatic latent image recorded on photoconductive surface 12 to development station C. Development station C includes a developer unit 20 having a housing with a supply of developer mix contained therein. The developer mix comprises carrier granules and toner particles. The carrier granules are formed from a magnetic material with the toner particles being formed from a heat-settable plastic. Preferably, developer unit 20 is a magnetic brush development system. In a system of this type, the developer mix is brought through a directional flux field to form a brush thereof. The electrostatic latent image recorded on photoconductive surface 12 is developed by bringing the brush of developer mix into contact therewith. In this manner, the toner particles are attracted electrostatically to the latent image forming a toner powder image on photoconductive surface 12. As the toner particles are depleted from the development system, additional toner particles are furnished thereto by a toner dispensing system. The toner dispensing system is described hereinafter with reference to FIGS. 2 through 4, inclusive.

With continued reference to FIG. 1, a sheet of support material is advanced by sheet feeding apparatus 22 to transfer station D. Sheet feeding apparatus 22 includes a feed roll 24 contacting the uppermost surface of the stack of sheets of support material 26. Feed roll 24 rotates in the direction of arrow 28 so as to advance the uppermost sheet from stack 26. Registration rollers 30 rotate in the direction of arrow 32, to align and forward the advancing sheet of support material into chute 34. Chute 34 directs the advancing sheet of support material into contact with drum 10 in a timed sequence so that the toner powder image developed thereon contacts the advancing sheet of support material at transfer station D.

At transfer station D, a corona generating device, indicated generally by the reference numeral 36, applies a spray of ions to the backside of the sheet of support material. This attracts the toner powder image from photoconductive surface 12 to the sheet of support material.

After transferring the toner powder image to the sheet of support material, the sheet of support material is advanced to a suitable fuser assembly. Thus, conveyor 38 advances the sheet of support material in the direction of arrow 40 to the fusing assembly, indicated generally by the reference numeral 42, located at fusing station E. Fuser assembly 42 comprises a heated fuser roller 44 and a backup roller 46. The sheet of support material, with the toner powder image thereon, passes between the heated fuser roller 44 and backup roller 46. After the fusing process, the sheet of support material is advanced by a series of rollers 48 to catch tray 50 for subsequent removal therefrom by the machine operator.

Invariably, after the sheet of support material is separated from photoconductive surface 12, some residual toner particles remain adhering thereto. These residual toner particles are removed from photoconductive surface 12 at cleaning station F. Initially, toner particles are brought under the influence of a corona generating device adapted to neutralize the remaining electrostatic charge on photoconductive surface 12 and that of the residual toner particles. Thereafter, the neutralized toner particles are cleaned from photoconductive surface 12 by a rotatably mounted fibrous brush in contact therewith. Subsequent to cleaning, a discharge lamp floods photoconductive surface 12 with light to dissipate any residual electrostatic charge remaining thereon prior to the charging thereof for the next successive imaging cycle.

Figure 2:
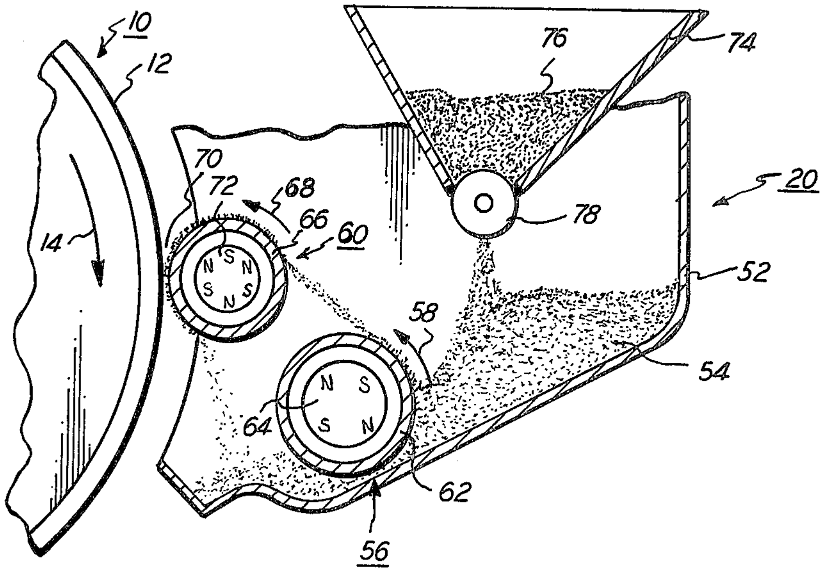
FIG. 2 is a schematic elevational view showing a development system employed in the FIG. 1 printing machine.

It is believed that the foregoing description is sufficient for purposes of the present invention to illustrate the general operation of an electrophotographic printing machine. Referring now to the specific subject matter of the present invention, FIG. 2 depicts developer unit 20 in greater detail. As shown therein, housing 52 has a chamber 54 for storing a supply of developer mix therein. Forwarding roller 56 advances the developer mix from the lowermost portion of chamber 54 in the direction of arrow 58 to developer roller 60. Forwarding roller 56 comprises an outer cylinder or tubular member 62 made of a non-magnetizable material and extending almost the length of housing 52. Tubular member 62 is mounted for rotation in housing 52. A magnetic member or cylinder 64 is disposed interiorly of tubular member 62, i.e. tubular member 62 is interfit telescopically over magnetic member 64. Magnetic member 64 has a plurality of magnetic poles impressed about the circumferential surface thereof. The pole arrangement is such that the developer mix advances in the direction of arrow 58. Advancement of the developer mix is achieved by magnetically attracting the developer mix to tubular member 62 which rotates in the direction of arrow 58 while magnetic member 64 remains stationary.

Developer roller 60 comprises a non-magnetizable cylindrical or tubular member 66 extending almost the length of housing 52. Tubular member 66 rotates in the direction of arrow 68 to advance the developer material therewith while magnetic member 72 remains stationary. As tubular member 66 rotates in the direction of arrow 68, the developer mix rotates therewith into development zone 70. In this manner, a brush of developer mix extends outwardly from tubular member 66 and contacts photoconductive surface 12. The electrostatic latent image recorded thereon attracts the toner particles from the carrier granules forming a toner powder image on photoconductive surface 12. Tubular member 66 is interfit telescopically over magnetic member 72. Magnetic member 72 has a plurality of poles impressed about the outer circumferential surface thereof. The pole arrangement is such the developer mix is attracted to tubular member 66 and rotates therewith into development zone 70. After the denuded carrier granules and residual developer mix moves away from development zone 70, they fall from tubular member 66 back into the lower region of chamber 54 of housing 52. Thus, it is evident that additional toner particles are required to be periodically added to chamber 54 of housing 52 so as to maintain optimum copy quality.

Hopper 74 stores a supply of toner particles 76 therein. Hopper 74 is coupled to tubular member 78 at one end portion thereof. Tubular member 78 has a plurality of apertures therein extending in a longitudinal direction substantially across housing 52. In this manner, additional toner particles are uniformly distributed from hopper 74 to chamber 54 of housing 52. The detailed structure of tubular member 78 is shown in FIGS. 3 and 4.

Figure 3:
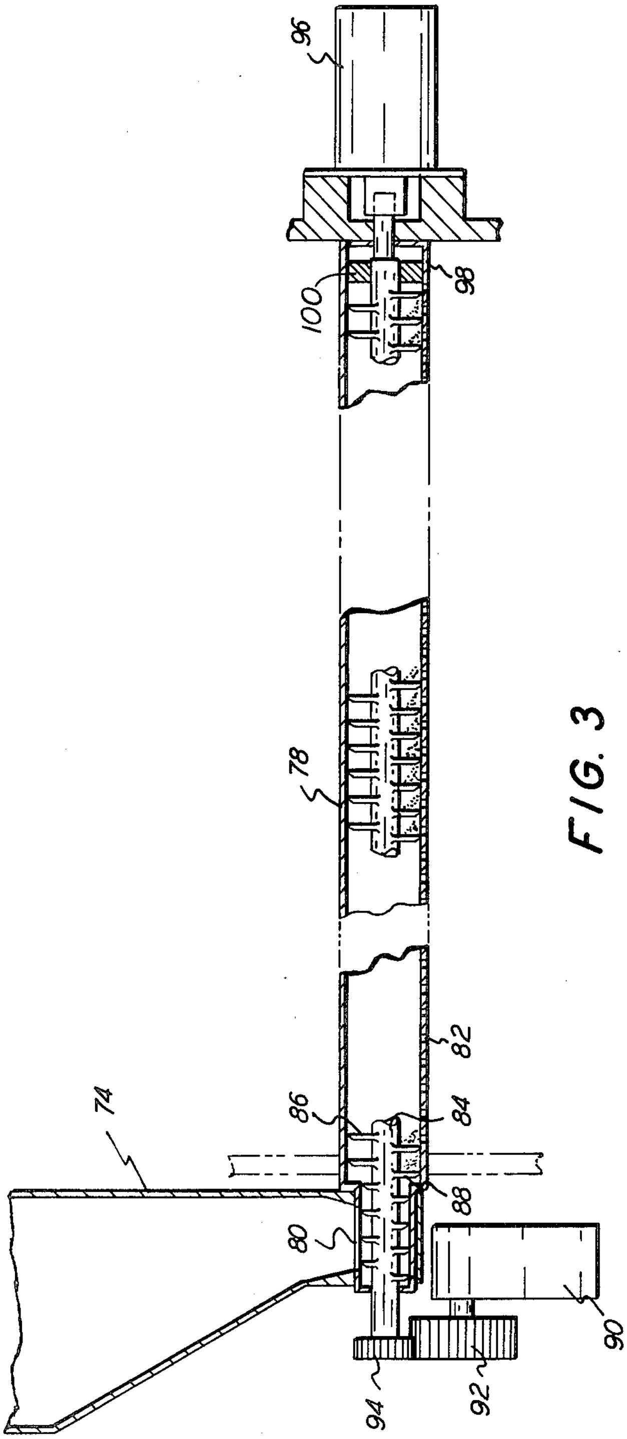
FIG. 3 is a schematic elevational view illustrating the toner particle dispenser employed in the FIG. 2 development system.

Referring now to FIG. 3, hopper 74 is connected to tubular member 78 at one end portion thereof. Tubular member 78 has an enlarged opening 80 connected to the opening in hopper 74. In this manner, the toner particles descend under the influence of gravity from hopper 74 through opening 80 into tubular member 78. Tubular member 78 has a plurality of apertures 82 extending in a longitudinal direction thereacross. Shaft 84 is mounted interiorly of tubular member 78 and has a pair of sets of paddles secured thereto. Both sets of paddles are secured to shaft 84 with one set of paddles 86 being staggered from the other set of paddles 88. Thus, the paddles of set 88 are opposed from the paddles of set 86 being located intermediate thereof. Thus, the paddles of set 86 are displaced linearly and angularly from the paddles of set 88. Stepping motor 90 is coupled to shaft 84 via gears 92 and 94. Gear 94 is secured to shaft 84 with gear 92 being secured to stepping motor 90. Gears 92 and 94 mesh with one another. In this way, shaft 84 may be indexed through a pre-selected angle when stepping motor 90 is actuated. Solenoid 96 is secured to the other end portion of shaft 84. Solenoid 96 causes shaft 84 to reciprocate. Thus, shaft 84 moves from a first position to a second position and, subsequently returns to the first position. In this manner, the toner particles are advanced along the longitudinal axis of tubular member 78. An enlarged aperture 98 is located at the other end of tubular member 78. A brush 100 is secured to shaft 84. As shaft 84 reciprocates, the residual toner particles, i.e. the particles not dispensed through apertures 82, are dispensed or discharged from tubular member 78 via enlarged aperture 98. In this way, all of the toner particles in tubular member 78 are discharged into chamber 54 of housing 52.

Figure 4C:
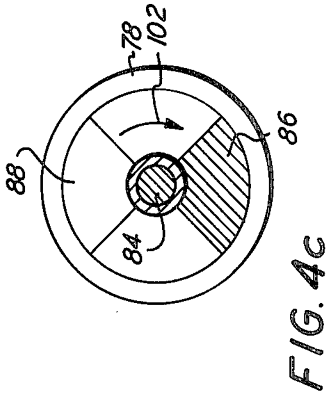
FIG. 4 depicts a fragmentary sectional view of a paddle orientation during the operation of the FIG. 3 toner particle dispenser.
Figure 4B:
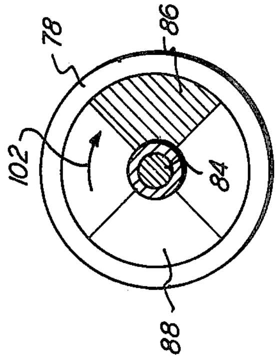
Figure 4A:
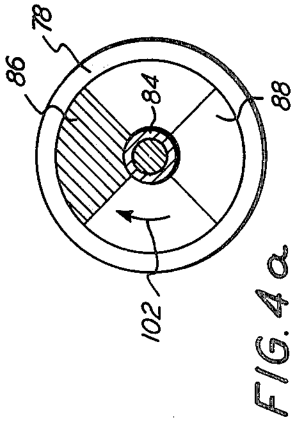

Turning now to FIG. 4, the operation of the toner dispensing system will be described. As shown in FIG. 4(a), paddle 86 is located in an upward vertical position with paddle 88 being located in a downward vertical position. At this time, solenoid 96 is actuated causing shaft 84 to translate from the first position to the second position. As shaft 84 translates, paddle 88 moves the toner particles in a longitudinal direction along tubular member 78 away from opening 80 so that they may be dispensed through apertures 82 therein. When shaft 84 reaches the second position, stepping motor 90 is actuated and rotates shaft 84 in the direction of arrow 102. Paddles 86 and 88 rotate 90° to the horizontal. The foregoing is shown in FIG. 4(b). Stepping motor 90 is now de-energized and solenoid 96 re-energized to push shaft 84 from the second position to the first position. When shaft 84 moves from the second position to the first position, paddles 86 and 88 are spaced from the toner particles, whereas when shaft 84 moves from the first position to the second position, paddles 88 are in engagement with the particles. Thus, as the paddles return from the second position to the first position, they are spaced from the toner particles and do not affect the movement of the toner particles. After shaft 84 has returned to the first position, solenoid 96 is once again de-energized and stepping motor 90 energized. This, in turn, causes shaft 84 to rotate through another 90° in the direction of arrow 102. This advances paddles 86 to the lowermost portion of tubular member 78 and paddles 88 to the uppermost portion thereof. At this time, the system is ready for the next successive cycle wherein the toner particles are advanced once again. The cycle is continuously repeated until the toner particles are advanced throughout the tubular member and dispensed therefrom into chamber 54 of housing 52. Actuation of stepping motor 90 and solenoid 96 is controlled by the machine logic associated with a control system for measuring the concentration of toner particles within the development system. Alternatively, the system may be controlled periodically during the machine cycle so as to add perscribed amounts of toner particles to the developer mix at pre-selected intervals of time.

In recapitulation, the toner dispensing system of the present invention gently advances the toner particles in a linear direction so that they may be uniformly dispensed from apertures in a tubular member across the chamber of the development housing. The toner particles are advanced by a plurality of staggered paddles disposed on a shaft. The shaft is mounted translatably and rotatably interiorly of the tubular member. The tubular member is coupled at one end portion thereof to a hopper housing a supply of toner particles therein. The toner particles are advanced across the tubular member, which extends substantially across the entire development housing. Substantially equally spaced apertures are located in the lowermost portion of the tubular member and extend in the longitudinal direction thereacross. These toner particles are uniformly dispensed from these apertures into the chamber of the development housing. Residual toner particles in the tubular member are dispensed from an enlarged aperture located at the end portion thereof opposed from the location of the toner particle hopper.

It is, therefore, evident that there has been provided in accordance with the present invention, an apparatus for dispensing toner particles into the development system of an electrophotographic printing machine. The apparatus of the present invention fully satisfies the objects, aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations as may fall within the spirit and broad scope of the appended claims.

What is claimed is:

1. An apparatus for dispensing particles, including:

means for storing a supply of particles therein;

an elongated tubular member having a plurality of spaced apertures extending in a longitudinal direction therein and having an opening in one end portion thereof coupled to said storing means enabling particles to enter said tubular member therefrom;

a shaft member mounted translatably and rotatably interiorly of said tubular member;

at least a pair of sets of paddles mounted fixedly on said shaft member with one set of said pair of sets of paddles being angularly and linearly displaced from the other set of said pair of sets of paddles;

a motor coupled to said shaft member, said motor indexing said pair of sets of paddles from the operative position with one of said pair of sets of paddles engaging the particles to the inoperative position spacing said pair of sets of paddles from the particle; and a solenoid coupled to said shaft member for translating said pair of sets of paddles from a first position to a second position with said pair of sets of paddles being in the operative position to advance the particles, and returning said pair of sets of paddles to the first position from the second position after said motor rotates said pair of sets of paddles to the inoperative position.

2. An apparatus as recited in claim 1, wherein said tubular member includes an enlarged aperture located in the other end portion thereof opposed from the end portion having the opening coupled to said storing means, and further includes means for sweeping the particles remaining in said tubular member into the enlarged aperture located in the other end portion of said tubular member.

3. A system for developing an electrostatic latent image recorded on a photoconductive member, including:

a housing defining a chamber;

means, disposed in the chamber of said housing, for depositing particles on the latent image;

means for storing a supply of particles therein;

an elongated tubular member having a plurality of spaced apertures extending in a longitudinal direction therein and having an opening in one end portion thereof coupled to said housing enabling particles to enter said tubular member;

a shaft member mounted translatably and rotatably interiorly of said tubular member;

at least a pair of sets of paddles mounted fixedly on said shaft member with one set of said pair of sets of paddles being angularly and linearly displaced from the other set of said pair of sets of paddles;

a motor coupled to said shaft member, said motor indexing said pair of sets of paddles from the operative position with one of said pair of sets of paddles engaging the particles to the inoperative position spacing said pair of sets of paddles from the particles; and a solenoid coupled to said shaft member for translating said pair of sets of paddles from a first position to a second position with said pair of sets of paddles being in the operative position to advance the particles, and returning said pair of sets of paddles to the first position from the second position after said motor rotates said pair of sets of paddles to the inoperative position.

4. A system as recited in claim 3, wherein said tubular member includes an enlarged aperture located in the other end portion thereof opposed from the end portion having the opening coupled to said storing means, and further includes means for sweeping the particles remaining in said tubular member into the enlarged aperture located at the other end portion of said tubular member so that the particles fall therethrough into the chamber of said housing.

5. A method of supplying additional toner particles to a development system, including the steps of:

storing a supply of toner particles in a container;

furnishing toner particles from the container to a tubular member having a plurality of apertures therein;

translating a shaft member having a plurality of paddles secured thereto from a first position to a second position to advance the toner particles along the tubular member so as to dispense the toner particles from the apertures therein into the development system;

energizing a stepping motor to index the shaft through a pre-selected angle, thereby rotating the paddles to space the paddles from the toner particles;

translating the shaft member from the second position to the first position; and sweeping the residual toner particles by a brush into an enlarged aperture located at one end of the tubular member.

6. A method as recited in claim 5, wherein said steps of translating includes the step of activating a solenoid coupled to the shaft so as to translate the shaft from the first position to the second position and to return the shaft from the second position to the first position.

* * * * *